A. W. GUTHAT.
DUSTING APPARATUS.
APPLICATION FILED JAN. 26, 1918.

1,298,933.

Patented Apr. 1, 1919.
2 SHEETS—SHEET 1.

INVENTOR
ALBERT W. GUTHAT

BY
ATTORNEYS

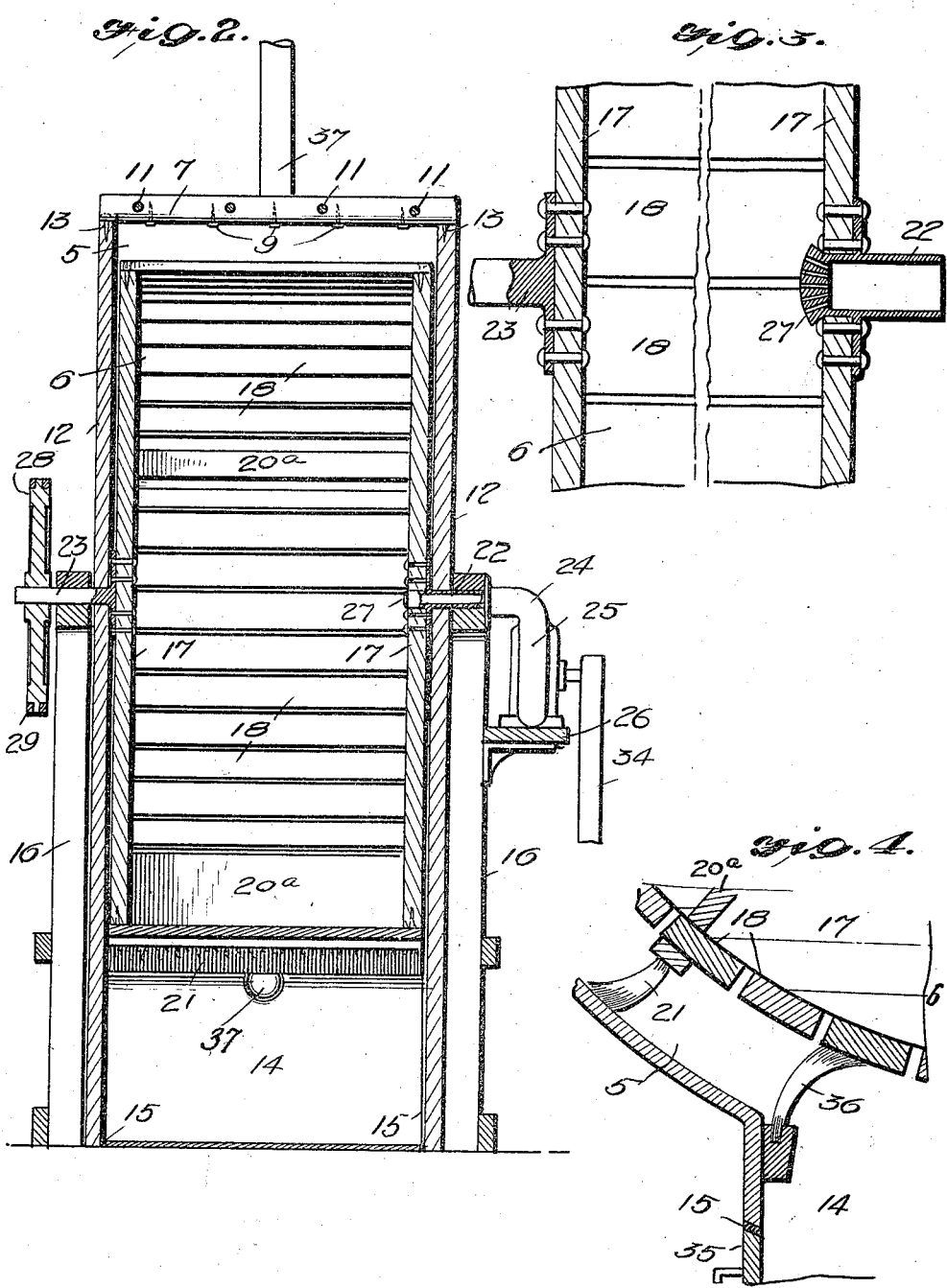

UNITED STATES PATENT OFFICE.

ALBERT W. GUTHAT, OF CHICAGO, ILLINOIS.

DUSTING APPARATUS.

1,298,933.  Specification of Letters Patent.  Patented Apr. 1, 1919.

Application filed January 26, 1918. Serial No. 213,926.

*To all whom it may concern:*

Be it known that I, ALBERT W. GUTHAT, a citizen of the United States, residing at Chicago, in the county of Cook and State of Illinois, have invented new and useful Improvements in Dusting Apparatus, of which the following is a specification.

This invention relates to apparatus for removing dust from empty cement or flour bags, or other articles, and its object is to provide an apparatus of this kind which is simple in construction and highly efficient in operation.

The object stated is attained by means of a novel combination and arrangement of parts to be hereinafter described and claimed, and in order that the same may be better understood, reference is had to the accompanying drawings forming a part of this specification.

In the drawings—

Fig. 2 is a central vertical section of the apparatus;

Fig. 3 is an enlarged sectional view showing an air inlet, and

Fig. 4 is an enlarged sectional view showing an arrangement of dust removing brushes.

Figure 1:
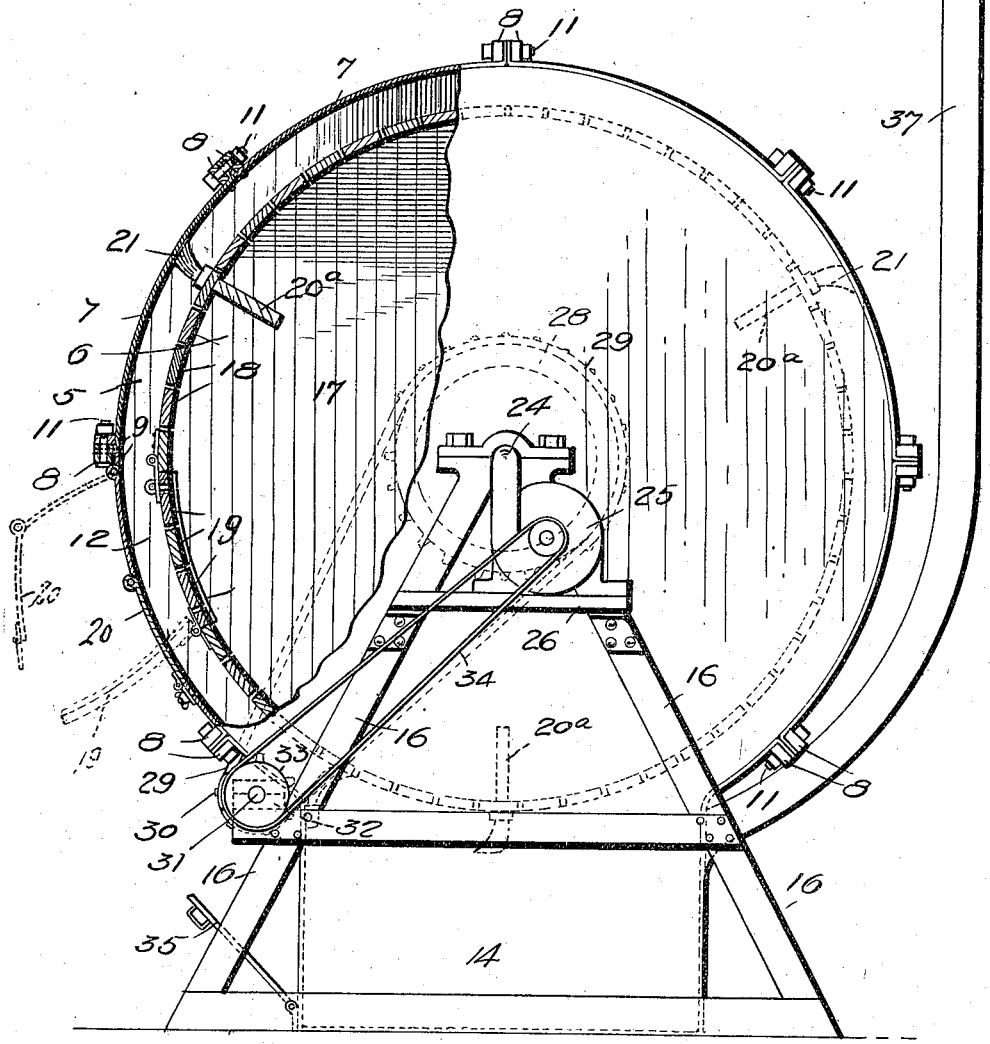
Figure 1 is an elevation of the apparatus partly broken away and in section.

Referring specifically to the drawings 5 denotes a stationary drum or other suitable air tight casing in which is housed a rotatable hollow drum 6 in which latter the bags or other articles to be freed from dust are placed. The periphery of the casing 5 is composed of bowed metal sheets 7 reinforced at their abutting ends by wooden cross bars 8 fastened by nails 9 and held together by bolts 11. The sheets 7 are secured to the end walls 12 of the casing by nails 13. The casing is extended at the bottom to form a hopper or pit 14, and the joints of the parts constituting the casing and the pit are packed with felt strips 15. The casing 5 is supported, with its axis horizontal, by a standard 16 at each end or side.

The drum 6 is composed of wooden end walls 17 and a periphery made up of spaced cross slats 18. The periphery of the drum is therefore perforated, and as its diameter is less than that of the casing 5, it is spaced from the peripheral wall of the latter. The periphery of the drum 6 has a hinged door 19 through which the articles to be dusted are placed in the drum and removed therefrom. The casing 5 has a door 20 to permit access to the door 19.

In the drum 6 are agitator blades or wings 20ª which extend inwardly and radially from the peripheral wall of the drum. The blades assist in an obvious manner to agitate the bags or other articles to be dusted when the drum 6 is in motion. The dust shaken out of the bags escapes from the drum 6 into the casing 5 through the perforated periphery of the former, and in order that the casing wall may be kept clear of dust, the drum carries two or more brushes 21 extending outward from its periphery to sweep over the casing wall.

On the end walls 17 of the drum 6 are mounted gudgeons 22 and 23 respectively, the first mentioned one being hollow for a purpose to be presently described. The two gudgeons pass through the end walls 12 of the casing 5 and are supported in suitable bearings on the standards 16.

The hollow gudgeon 22 passes through one of the end walls 17 of the drum 6 and opens into the drum at its inner end, its outer end being also open and connected to the outlet 24 of a rotary or other suitable type of blower 25 mounted on a shelf 26 carried by one of the standards 16. Thus, it will be seen that a current of air may be discharged into the drum 6. The inner end of the gudgeon 22 is formed with a nozzle 27 to distribute the air over a large area and fill the drum evenly.

On the gudgeon 23 is a sprocket wheel 28 connected by a chain 29 to a sprocket wheel 30 on a shaft 31 obtaining motion from any suitable source. The shaft 31 is supported in suitable bearings 32 on the standards 16, and has a pulley 33 over which passes a belt 34 for driving the blower 25.

The hopper or dust pit 14 has an end door 35 for removal of its contents, and also supports a transverse brush 36 extending forward to engage the periphery of the drum 6 to sweep the same clean of dust. It will be noted that the brush 36 extends into the path of the brushes 21, and it is therefore agitated and cleared of dust when the drum is in motion carrying the brushes 21 around with it. The dust shaken from the brush 36 drops into the pit 14.

The pit 14 also has a discharge pipe or conduit 37 for the air which is discharged into the drum 6 by the blower 25, so that a constant draft of air is maintained in the apparatus when it is in operation.

The bags or other articles in the drum 6 are quickly and thoroughly cleaned, the dust being removed by the agitation to which they are subjected. The dust is blown out of the drum into the casing 5 and carried into the pit 14, the brushes 21 and 36 preventing the same from accumulating in the casing or on the drum.

I claim:

1. In a dusting apparatus, a rotatable drum having dust escape openings, a casing in which the drum is housed, said casing having a dust outlet, brushes carried by the drum and engageable with the casing wall to sweep the same, and a brush extending into the casing into contact with the drum and located in the path of the first mentioned brushes.

2. In a dusting apparatus, a rotatable drum having dust escape openings, a casing in which the drum is housed, said casing having a dust receiving pit, brushes carried by the drum and engageable with the casing wall to sweep the same, and a brush extending from the pit into the casing into contact with the drum, and located in the path of the first mentioned brushes.

3. In a dusting apparatus, a rotatable drum having dust escape openings, a casing in which the drum is housed, said casing having a dust outlet, a brush extending into the casing and into contact with the drum, and means carried by the drum for agitating said brush.

In testimony whereof I affix my signature.

ALBERT W. GUTHAT.

Copies of this patent may be obtained for five cents each, by addressing the "Commissioner of Patents, Washington, D. C."